UNITED STATES PATENT OFFICE.

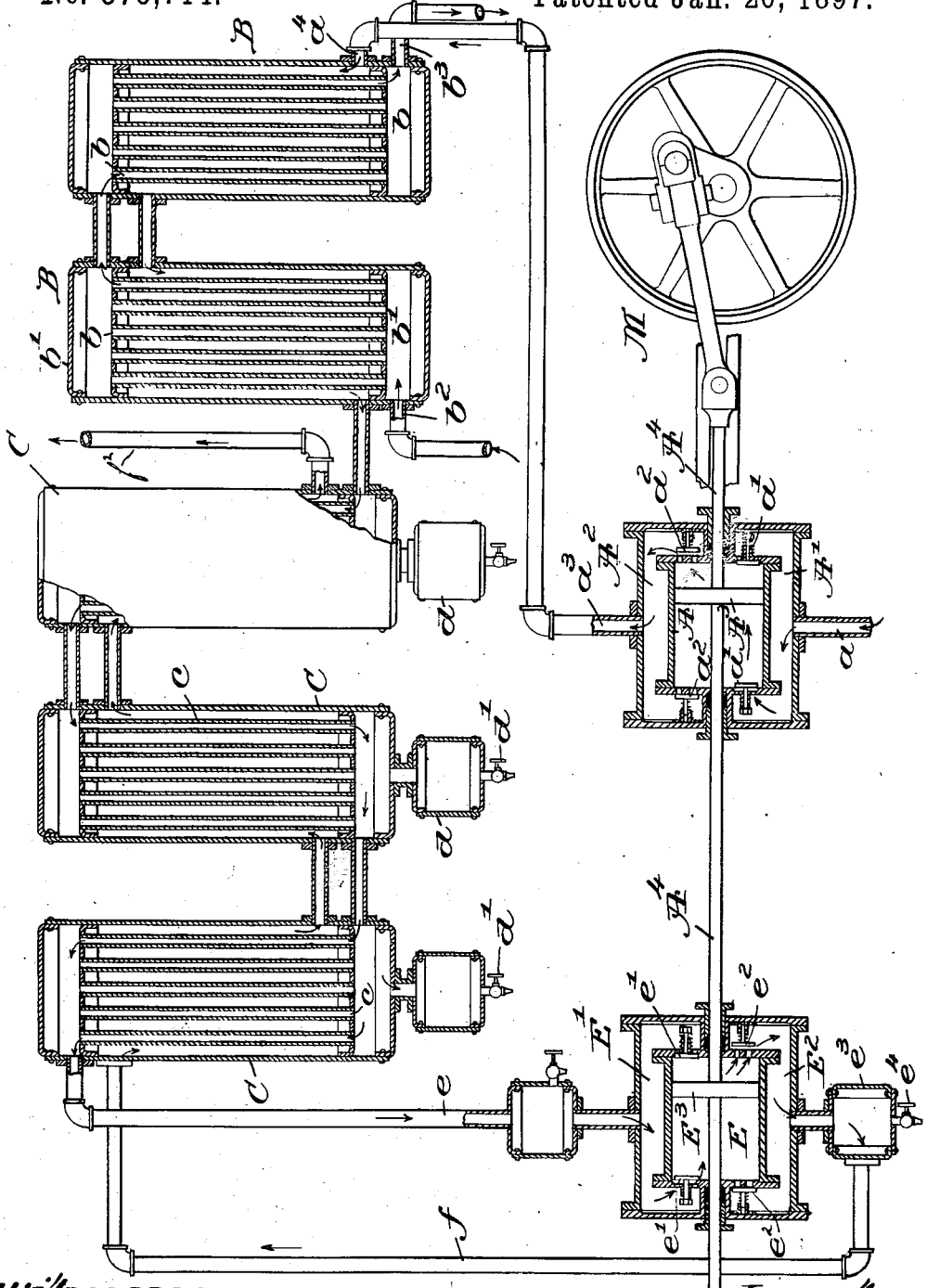

CHRISTIAN HEINZERLING, OF FRANKFORT-ON-THE-MAIN, GERMANY.

PROCESS OF RECOVERING VOLATILE SUBSTANCES FROM AIR OR OTHER GASES.

SPECIFICATION forming part of Letters Patent No. 575,714, dated January 26, 1897.

Application filed December 28, 1893. Serial No. 494,997. (No specimens.) Patented in England July 4, 1892, No. 12,390; in Belgium February 15, 1893, No. 103,463, and in Austria-Hungary August 29, 1893, No. 10,893.

*To all whom it may concern:*

Be it known that I, CHRISTIAN HEINZERLING, a subject of the Emperor of Germany, residing at Frankfort-on-the-Main, Germany, have invented an Improvement in Processes for the Recovery of Easily-Volatile Substances from Air or other Gases, (for which I have received patents in England, dated July 4, 1892, No. 12,390; in Belgium, dated February 15, 1893, No. 103,463, and in Austria-Hungary, dated August 29, 1893, No. 10,893,) of which the following description, in connection with the accompanying drawing, is a specification, like letters on the drawing representing like parts.

In several operations, such as obtaining coke, tar, and ammonia from coal; in the distillation of peat and bituminous shale to obtain the oils therein; the distillation of wood for the production of acetic acid and wood spirit; in the preparation of waterproof texture or tissue and in the production of smokeless powder, and in the production of chloroform, carbon bisulfid, or carbon tetrachlorid, or in any other similar operation where easily-volatile substances are produced as products of manufacture or are used as solvents or reagents, the separation and recovery of such easily-volatile substances when mixed with air or other permanent gases are very incomplete and imperfect.

This invention has for its object the production of a process by which such easily-volatile substances may be very completely and readily separated and recovered from the air or other gases with which they are mixed.

In accordance therewith my invention consists, in a process for recovering easily-volatile substances from air or other gas charged therewith, in compressing the said charged air or gas, and then cooling it to the temperature requisite to cause the separation of the volatile substance in condensed form, substantially as will be described.

Other features of my invention will be hereinafter described, and particularly pointed out in the claim.

The accompanying drawing shows in vertical section one form of apparatus by which my process may be carried out.

The air or other gas which contains the substance to be separated in the form of vapor or gas is, if necessary, cooled to the temperature of the atmosphere and then compressed in any suitable form of compressing apparatus to from two to six atmospheres, according to circumstances.

Referring to the drawing, I have shown a compressing-cylinder A, an inlet-chamber A', and an outlet-chamber $A^2$, inlet-valves $a'$ and outlet-valves $a^2$ closing and opening at the proper times the openings between the cylinder and chambers, and all of usual or well-known construction in such apparatus. A piston $A^3$, fast on a piston-rod $A^4$, is reciprocated in the cylinder A by a suitbale motor M, a part only of which is shown. The air or other gas to be treated is delivered to the chamber A' by the inlet-port $a$, and after compression in the cylinder A is forced out of chamber $A^2$ through the eduction-pipe $a^3$ and into coolers B, herein shown as closed shells containing nests of pipes $b$, secured at their ends to headers $b'$.

In the indirect method of cooling, cold water is admitted to the coolers at $b^2$ and passes through the pipes $b$ and out at $b^3$, the air or gas entering the coolers at $a^4$ and circulating around the pipes through which the cold water is passing, the water in such passage abstracting a large amount of heat from the air or gas and reducing its temperature to between $+8°$ and $+10°$ centigrade, and at such reduced temperature it passes into a second series of connected coolers C, very similar to the coolers B, in this instance, however, the air or gas passing through the pipes and the cooling medium circulating around them. This medium is preferably a previously cooled and expanded portion of the air or gas from which the desired volatile substance has been separated and recovered. By passing such expanded gas, which is very cold, through the coolers C and around the pipes $c$ therein the compressed air or gas under treatment is reduced in temperature to from $-25°$ to $-40°$ centigrade, or to near the volatile point of the substance to be recovered, whereby a portion thereof will be condensed and liquefied or solidified and deposited. This portion is collected in receivers $d$, connected to the bottoms of the coolers C, suitable cocks $d'$ being provided whereby the condensed substance may be withdrawn.

In the drawing I have shown two water-coolers and three air-coolers; but a greater or less number of either or both may be employed, if desired, of larger or smaller size.

The number and size of the air-coolers depends upon the quantity of the gases to be cooled, and I have found it very satisfactory to select the size of the coolers so that the gases in a compressed state are cooled down to from $-25°$ to $-40°$ centigrade, as hereinbefore stated.

From the coolers the gas is conducted by pipe $e$ to an expansion-cylinder E, provided with inlet and outlet chambers $E'$ and $E^2$, respectively, and having inlet-valves $e'$ and outlet-valves $e^2$, the compressed gas entering the cylinder at one or the other side of a piston $E^3$, fast on the piston-rod $A^4$, and by its expansion aids the compressing-pump in its work.

In its expanded state, which is at substantially normal atmospheric pressure, the gas passes from the outlet-chamber $E^2$ through a receiver $e^3$, in which the last remaining portion of the substance to be recovered is condensed and deposited, from which it may be removed when convenient by a cock $e^4$, a similar receiver $e^5$ being located in the pipe $e$ between the coolers and the expansion-cylinder. The expansion of the gas further reduces its temperature to from $-60°$ to $-80°$ centigrade, and it is then conducted by pipe $f$ to the coolers C, entering at $f'$ and circulating around the pipes $c$ to cool the air or gas under treatment as it passes through the pipes $c$, as hereinbefore described. When the expanded air or gas has circulated through the coolers, it is discharged therefrom at $f^2$, and when a series of coolers are employed, as herein shown, they are connected in usual manner, as shown, so that the compressed and the expanded air or gas may pass therethrough, as described.

It is convenient to arrange the coolers so that they can be thrown into or out of action separately, in order to avoid danger of stoppage if the bodies separated from the gases are solid in form, such as carburet of hydrogen or sulfuret of carbon. By this arrangement when a stoppage occurs the affected cooler can be shut off and a new one inserted.

The substance which has been separated in a solid state may be melted in any desired manner, as by the direct introduction of uncompressed gases into the receivers.

Instead of conducting the cold expanded air or gas to coolers, as described, to indirectly cool the compressed air or gas under treatment, it may be used to cool liquids which have a very low freezing-point, $-20°$ to $-40°$ centigrade, for instance, a solution of common salt, calcium-chlorid solution, or glycerin, which liquids may then be used for cooling the compressed gases by forcing the latter through said liquids. This method of direct cooling by liquids and the choice of the latter is materially limited, as the substance to be separated must be insoluble or nearly so in the liquid. In the separation of carbon bisulfid, carbon tetrachlorid, petroleum, benzine, and chloroform, this direct method may be judiciously used, as said substances are nearly insoluble in a solution of calcium chlorid, and some of them are not soluble in glycerin.

Cooling by liquids having low freezing-points may be employed when the substances to be separated dissolve in the liquid; and when a certain quantity of the substance is dissolved in the liquid it may be separated by distillation or other means.

If alcohol, acetone, acetic ether, or ether which is soluble in common salt and calcium-chlorid solution, glycerin, &c., are being treated, indirect cooling, as hereinbefore described, is preferable.

I claim—

The herein-described process for separating and recovering easily-volatile substances from air or other gas, which consists in compressing the air or other gas containing the substance to be recovered; reducing its temperature indirectly by water while compressed; further reducing its temperature by indirect contact with previously-expanded portions of the air or gas, a portion of the volatile substances being separated by the latter reduction of temperature; and finally permitting the air or gas to expand to substantially normal pressure, whereby the remaining volatile substances are separated, substantially as described.

In testimony whereof I have signed my name to this specification in the presence of the two subscribing witnesses.

CHRISTIAN HEINZERLING.

Witnesses:
  ALVESTO S. HOGUE,
  CHARLES A. LANG.